United States Patent Office 2,934,579
Patented Apr. 26, 1960

2,934,579

HYDROCARBON ISOMERIZATION PROCESS AND CONVERSION CATALYST

George E. Serniuk, Roselle, and Charles E. Morrell, Summit, N.J., assignors to Esso Research and Engineering Company, a corporation of Delaware No Drawing. Application July 30, 1956
Serial No. 600,689

10 Claims. (Cl. 260—683.75)

The present invention relates to improved catalysts for hydrocarbons. More particularly, it relates to catalytic hydrocarbon conversions executed in the presence of metal halides, of the Friedel-Crafts type, in combination with a hydride.

Aluminum halide catalysts, of the type known as Friedel-Crafts catalysts, have heretofore been employed as activating agents for various types of organic reactions such as, for example, the alkylation of isoparaffins with olefins, the nuclear alkylation of aromatics with alkyl chlorides, alcohols or olefins, the isomerization of normal paraffins to isoparaffins and the polymerization of olefins to form normally liquid olefins of higher molecular weight which upon hydrogenation are suitable for use as motor fuel constituents.

In these reactions, and in particular in isomerization reactions, aluminum halide catalysts in conjunction with hydrogen halides, alkyl halides, etc., react with $C_5$ and higher isoparaffins and olefins to produce a sludge. This sludge materially reduces the life of the catalyst and frequently requires its replacement with fresh catalyst.

Attempts have been made to minimize sludge formation by employing additives, such as salts, various hydrocarbons and complexing agents. A few of these additives have been used with some success with hydrocarbons having five or less carbon atoms, but have been almost totally ineffective in the case of higher hydrocarbons because sludging is quite severe when the carbon number exceeds 5.

It has now been discovered that a non-sludging Friedel-Crafts type catalyst can be prepared and used in a great variety of catalytic reactions, particularly isomerization and/or cracking processes. It has been found that by modifying these catalysts with certain ionic hydrides, especially monovalent hydrides, such as alkali and alkaline earth metal hydrides, it is possible to greatly reduce, and in some cases eliminate, catalyst sludging. In carrying this invention the hydride may be mixed with the catalyst before it is introduced into the reaction vessel, or, alternatively, the hydride may be placed in the vessel followed by the addition of the Friedel-Crafts catalyst. The preferred method is to make a premix of catalyst and hydride because it is believed that the alkali hydride combines with the Friedel-Crafts catalyst, producing a substance containing hydride as well as halogen ions. When the catalyst and hydride are so united a modified catalyst results, having the unexpected property of being non-sludging.

Degradation reactions in paraffin isomerization are thought to occur as a result of decomposition reactions of positively charged hydrocarbon fragments called carbonium ions. Such degradation reactions cause excessive cracking of the hydrocarbon feed and also cause the Friedel-Crafts catalyst to sludge, i.e. to become deactivated by combination with highly unsaturated byproducts from the degradation reactions. Carbonium ions are thought to be necessary intermediates in isomerization reactions but the latter reactions proceed relatively fast as compared to the degradation reactions which produce the sludging materials. Consequently, while the formation of carbonium ions is desirable, it is likewise desirable to limit the duration of their existence in order to minimize degradation reactions. It has been found that hydride ions readily combine with carbonium ions to produce stable hydrocarbon molecules. If no hydride is added to the Friedel-Crafts catalyst, the concentration of hydride ions is relatively low and therefore the individual carbonium ions exist long enough to undergo extensive degradation reactions. Addition of a metal hydride increases the hydride ion concentration markedly and therefore effectively controls the degradation reactions of the carbonium ions.

These beneficial results are obtainable with very small amounts of hydride. In fact, the required quantities are small in relationship to the demands of the isomerization and cracking reactions, which produce largely branched paraffins. This surprising effect is believed to be due to the continuous regeneration of hydride ion from added hydrogen gas and possibly from the tertiary hydrogens of isoparaffins added (intentionally) with the feed or produced in the reaction. The latter source of hydride ions would not result in a net increase in total hydride hydrogen, actual and potential, but could conceivably increase the overall reactivity of the hydride ions by a purely catalytic effect, thereby resulting in greater availability of these ions for reaction with the more unstable, sludge-producing types of carbonium ion intermediates. On the basis of this, it would be expected that molecular hydrogen, especially in the presence of alkali metal hydrides, would not only retard sludge formation but would also promote isomerization relative to cracking. The experimental data show these effects actually occur.

Suitable Friedel-Crafts type catalysts that may be employed $AlCl_3$, $AlBr_3$, $AlClBr_2$, $AlCl_2Br$, $AlCl_2$—$AlCl_2$, $AlBr_2$—$AlBr_2$, $AlCl_2$—$AlBr_2$, $HFAl_2Cl_6$-benzene, $AlCl_2OH$, $AlBr_2OH$, $AlCl_2OMe$, $BF_3$, $HF:BF_3$ and $HF$.

The aluminum and chloride containing catalysts are preferred. The catalyst may or may not be combined with a solvent, such as ether, dioxane, sulfur dioxide, etc.

Simple or complex hydrides suitable for use in accordance with the invention are those which fall into a class called ionic hydrides, such as the hydrides of alkali metals and alkaline earth metals. Other elements that may be employed as hydrides are uranium, titanium, zirconium, thorium, nickel, cobalt, iron, manganese, niobium, vanadium, tantalum, chromium, molybdenum, tungsten, zirconium and hafnium. Covalent hydrides, such as those of aluminum, boron, etc., may also be employed. The monovalent hydrides are preferred, and alkali metal hydrides are especially preferred.

The modified catalysts may be used as such or may be supported on an appropriate substance, such as alumina, hydrogen fluoride-treated alumina, alcoholate alumina, thoria, titania, clays, silica, alumina-silica, coke, carbon, activated carbon or graphite.

The hydride-modified Friedel-Crafts catalyst may be used in the presence or absence of hydrogen, isobutane or recycle products. The use or non-use of these compounds or mixtures thereof, is dependent on the reaction requirements. The reaction temperatures may be adjusted for the best equilibrium yields. However, they may vary from below room temperature to about 250° C.

The molar ratio of hydride to Friedel-Crafts catalyst should be between about 0.001:1 to 1:1, and a molar ratio of about 0.02:1 to 0.15:1 is preferred.

The following examples will illustrate the nature of the present invention, but it is understood that it is not restricted thereto.

Example I

A reaction vessel was charged with 200 ml. (135 g.) of normal heptane, 68 g. of sublimed, powdered, anhydrous aluminum chloride and 0.202 g. of lithium hydride. The vessel was pressured to 1420 p.s.i.g. with hydrogen at room temperature and shaken for 17¾ hours at 155° C. At the end of this time the pressure was released and 38.96 liters of gas were recovered at 25.5° C. and 763.5 mm. pressure. The liquid product, recovered by decantation from the catalyst, amounted to 118.8 g. The product was then distilled under an Oldershaw column, one inch by thirty plates, at a 20:1 reflux ratio. The conversion was 35.84 weight percent. The catalyst was clean and in a crystalline state.

Example II

A reaction vessel was charged with 200 ml. (135.5 g.) of normal heptane, 68 g. of sublimed, powdered, anhydrous aluminum chloride and 12.7 g. of titanium hydride. The vessel was pressured at room temperature with hydrogen to 1500 p.s.i.g. and shaken for 17¾ hours at 65° C. The pressure was released and 48.94 liters of gas was collected at 27° C. and 761.8 mm. pressure. The recovered liquid product weighed 108.5 g. The liquid product was fractionated as in Example I. The conversion was 68.75 weight percent. The catalyst was solid and had a gray color. There was no indication of liquid complex formation between the catalyst and the conversion products.

The following experiment was undertaken to demonstrate the improvement brought about by the use of the hydrides herein disclosed. A reaction vessel was charged with 200 ml. (135.5 g.) of normal heptane and 68 g. of anhydrous, sublimed, powered aluminum chloride. It was pressured at room temperature to 1400 p.s.i.g. with hydrogen and shaken for 17¾ hours at 155° C. The pressure was released and 47.39 liters of gas were recovered at 25° C. and 755.6 mm. The liquid product amounted to 91.9 g. Upon fractionating the liquid product under the conditions set forth in the examples, it was found that the conversion was 68.81 weight percent. The catalyst was discolored and partially liquefied (sludged). Thus the unmodified catalyst was degraded when substantially the same conditions were employed.

This serves to illustrate the improvement imparted by the present invention. The hydride prevents degradation of the catalyst and leaves it in a useable state. The modified catalyst of the present invention may be used in continuous processes to reduce the amount of new catalyst required to maintain the necessary activity in the reaction vessel as well as batch type processes.

The following table demonstrates the selectivity of the modified and unmodified catalysts used in the examples. The results are weight percent of feed converted to compounds having a carbon number between 4 and 7.

|  | Number of Carbon Atoms | | | |
| --- | --- | --- | --- | --- |
|  | 4 | 5 | 6 | 7 |
| Lithium hydride—modified catalyst | 18.6 | 22.4 | 15.1 | 44 |
| Titanium hydride—modified catalyst |  | 26.9 | 17.8 | 25.8 |
| Untreated Catalyst | 33.2 | 27.5 | 16.3 | 23 |

The data in the above table show that the modified catalysts are just as selective as aluminum chloride in isomerization reactions, and in addition the reaction takes place without catalyst deactivation by sludging.

In accordance with this invention, therefore, a modified Friedel-Crafts type catalyst is disclosed which does not sludge when used in isomerization and/or cracking processes. The improved catalyst is modified with a metal or nonmetal hydride.

Resort may be had to various modifications and variations of the present invention without departing from the spirit or scope of the appended claims.

What is claimed is:

1. In an isomerization process wherein the structure of straight chain hydrocarbons is altered at temperatures ranging from normal atmospheric temperature up to about 250° C., the improvement which comprises employing in the process a modified catalyst formed by mixing about 0.001 to 1 mol of a metal hydride with 1 mol of a Friedel-Crafts catalyst, and recovering from the process a product and a sludge-free catalyst.

2. In an isomerization process wherein straight chain hydrocarbons are converted to branched chain hydrocarbons at temperatures ranging from room temperature to about 250° C. in the presence of a catalyst, the improvement which comprises employing a modified catalyst containing halogen ions and hydride ions formed by mixing about 0.001 to 1 mol of a metal hydride with 1 mol of a Friedel-Crafts catalyst, and recovering from the process a product and a sludge-free catalyst.

3. The isomerization process defined by claim 2 in which the hydride is an alkali metal hydride.

4. The isomerization process defined by claim 2 in which the hydride is lithium hydride and the Friedel-Crafts catalyst is aluminum chloride.

5. Isomerization process as defined by claim 2 wherein the reaction is conducted in the presence of hydrogen under pressure.

6. A modified catalyst for hydrocarbon conversion reaction prepared by reacting about 0.02 to about 0.15 mol of an alkaline earth metal hydride with 1 mol of aluminum chloride.

7. A modified catalyst for hydrocarbon conversion reaction prepared by reacting about 0.02 to about 0.15 mol of alkali metal hydride with 1 mol of aluminum chloride.

8. A modified catalyst as defined in claim 7 wherein the alkali metal hydride is lithium hydride.

9. A modified catalyst for hydrocarbon conversion reaction prepared by reacting about 0.02 to about 0.15 mol of group IV metal hydride with 1 mol of aluminum chloride.

10. A modified catalyst as defined in claim 9 wherein the group IV metal hydride is titanium hydride.

References Cited in the file of this patent

UNITED STATES PATENTS

| 2,418,441 | Whitman | Apr. 1, 1947 |
| --- | --- | --- |
| 2,443,606 | D'Ouville et al. | June 22, 1948 |
| 2,468,260 | Gibb | Apr. 26, 1949 |
| 2,576,311 | Schlesinger et al. | Nov. 27, 1951 |
| 2,721,189 | Anderson et al. | Oct. 18, 1955 |
| 2,753,255 | Alexander et al. | July 3, 1956 |

OTHER REFERENCES

Wiberg et al.: Z. Naturforsch., 6b, 458–461 (1951).